May 26, 1970

A. E. McQUINN 3,514,038

ADJUSTABLE SPRAY UNIT

Filed Feb. 14, 1968

INVENTOR.
ALVIN E. McQUINN

BY

*Orrin M. Haugen*

ATTORNEYS

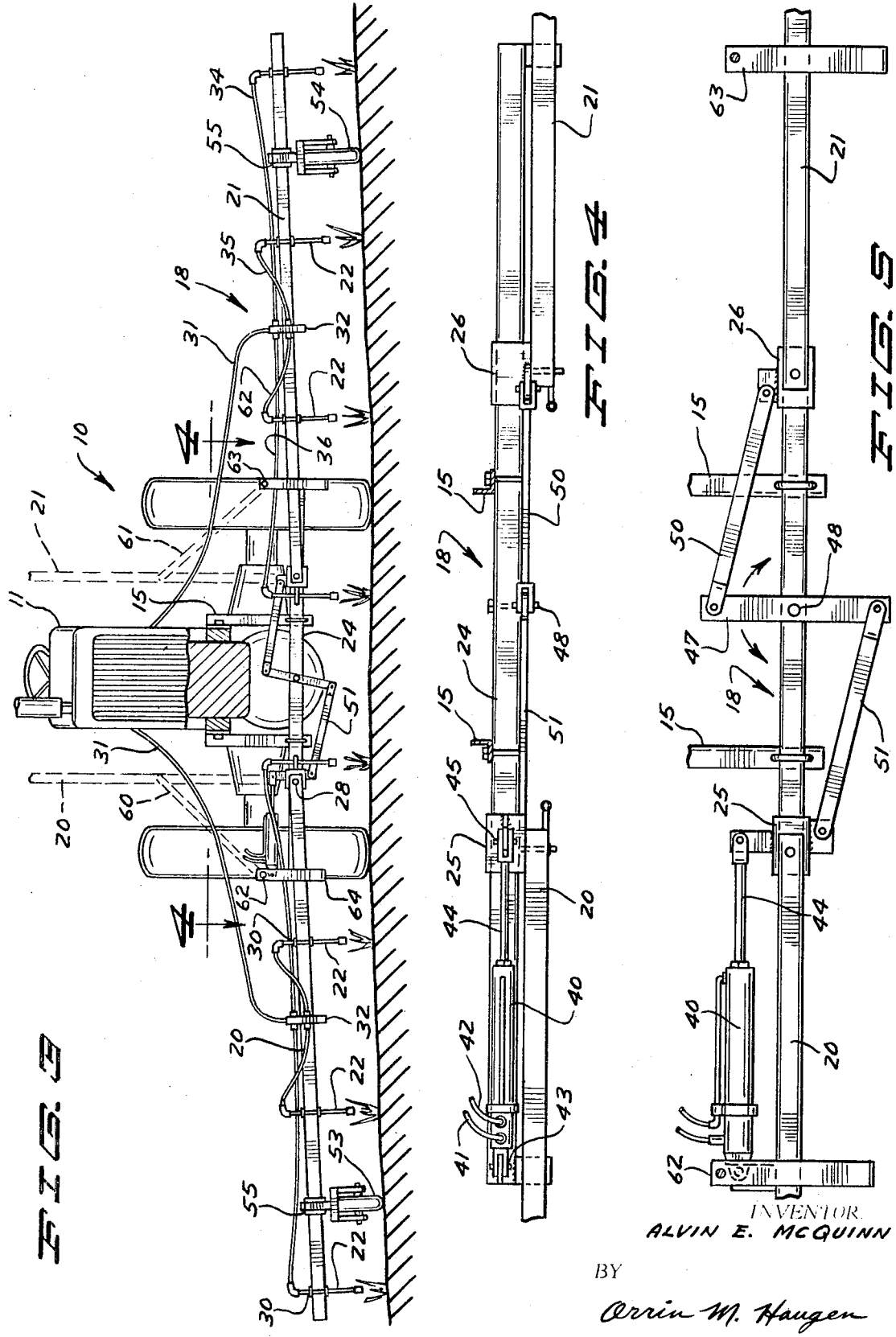

United States Patent Office 3,514,038
Patented May 26, 1970

1

3,514,038
ADJUSTABLE SPRAY UNIT
Alvin E. McQuinn, Minneapolis, Minn., assignor to Ag-Chem Equipment Co., Inc., Minneapolis, Minn., a corporation of Minnesota
Filed Feb. 14, 1968, Ser. No. 705,475
Int. Cl. B05b 1/20
U.S. Cl. 239—165                                                          9 Claims

ABSTRACT OF THE DISCLOSURE

Spray apparatus comprising a spray boom having means for coupling to a source of spray composition under pressure, the boom having right and left laterally extending arms, each arm having a plurality of spray heads arranged in spaced spray discharge relationship therealong, each of the arms being coupled at its inner end to a common carrier member, the carrier member defining a common transverse axis for the spray boom and means for reciprocably moving each of said arms toward and away from said common transverse axis.

---

The present invention relates generally to spray apparatus, and more specifically to a spray apparatus comprising a spray boom having a pair of laterally extending arms, and being adapted to spray multi-row crops. In the spraying of crops utilizing laterally extending spray arms forming an elongated boom, it is frequently desirable to cover as many rows as is reasonably possible; and consistent with the techniques of planting, it is frequently possible to spray a crop area which is double the width of the individual planting rows. In other words, the spraying mechanism can normally be capable of spraying the rows planted by two individual passes of the planter.

While check and cross-check techniques are available for planting, the crops are normally disposed in a disposition wherein the individual groups of rows are spaced at a distance which may vary between individual passes. Thus, constant plant spacing is available throughout the planted rows of an individual pass, the exception being the spacing between the rows forming the outer rows of the individual passes. Here the operator of the planter forms what is generally known as a "guess-row." The guess-rows have a spacing between individual passes which is variable, depending upon the motion imparted to the planting equipment by the operator. The arrangement of these guess-rows creates a problem insofar as consistency of spraying, since the spray mechanism may be adjusted so as to spray the widths of the rows in a reguarly spaced disposition.

In accordance with the present invention, the individual arms of the spray boom may be reciprocably moved inwardly and outwardly in order to accommodate or compensate for the uneven spacing of the crops in the guess-row zone or area. If the planter has arranged converging passes, the boom arms are retracted inwardly in order to accommodate the uneven spacing, with the spray mechanism being arranged to bisect the distance between these mutually adjacent guess-rows.

2

Therefore, it is an object of the present invention to provide an improved spray apparatus which is adapted to accommodate uneven spacing between individual planter passes in the guess-row area.

It is a further object of the present invention to provide means for mutually reciprocably retracting and extending spray arms so as to accommodate spacing in guess-row areas.

It is yet a further object of the present invention to provide an improved linkage means for controllably extending or retracting spray boom arms on a mutually coordinated basis.

Other and further objects of the present invention will become apparent to those skilled in the art upon a study of the following specification, appended claims, and accompanying drawings wherein:

FIG. 3 is a front elevational view of the spray boom apparatus taken along the lines 3—3 of FIG. 2; and illustrating, in phantom, a retracted transport disposition of the boom arms;

FIG. 4 is a top elevational detail view of the spray boom arms on a slightly enlarged scale taken along the lines 4—4 of FIG. 3 and illustrating the inner end portions only of the extensible arms, along with the central carrier member; and FIG. 5 is a detail front elevational view of that portion of the apparatus shown in FIG. 4.

Figure 1:
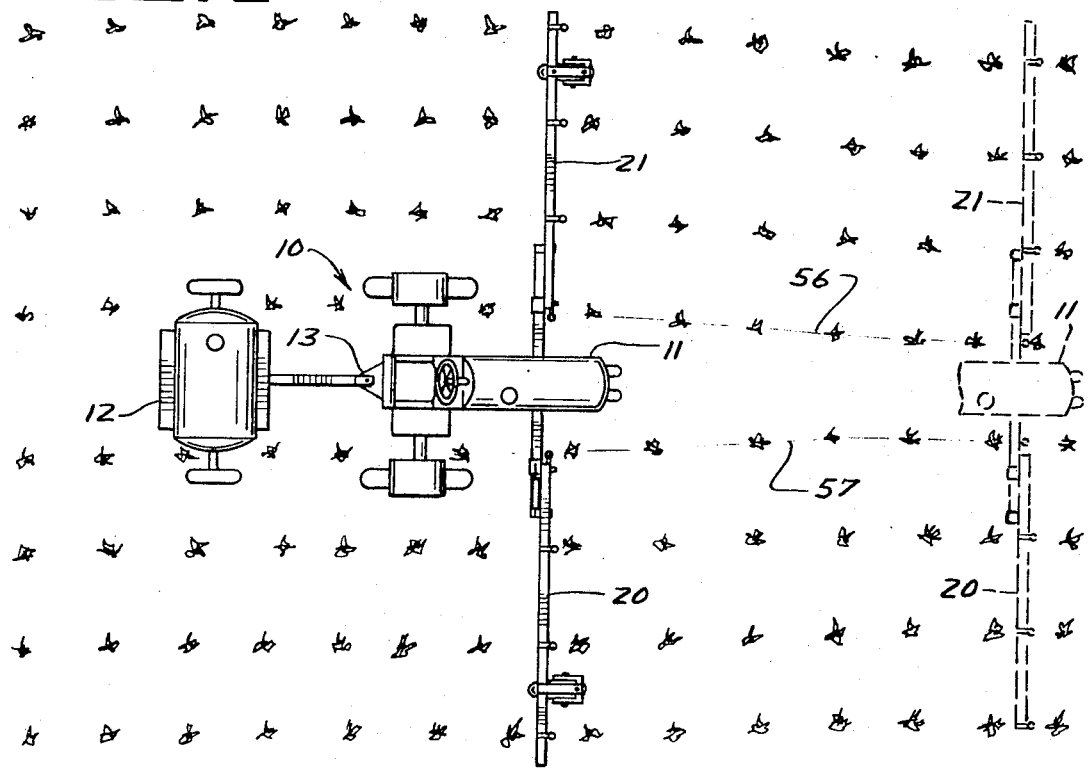
FIG. 1 is a top plan view of a spray rig carrying the improved spray apparatus of the present invention, and illustrating the operation of the rig in a guess-row zone, and further illustrating, in phantom, the disposition of the boom upon entering and passing through the guess-row areas.
Figure 2:
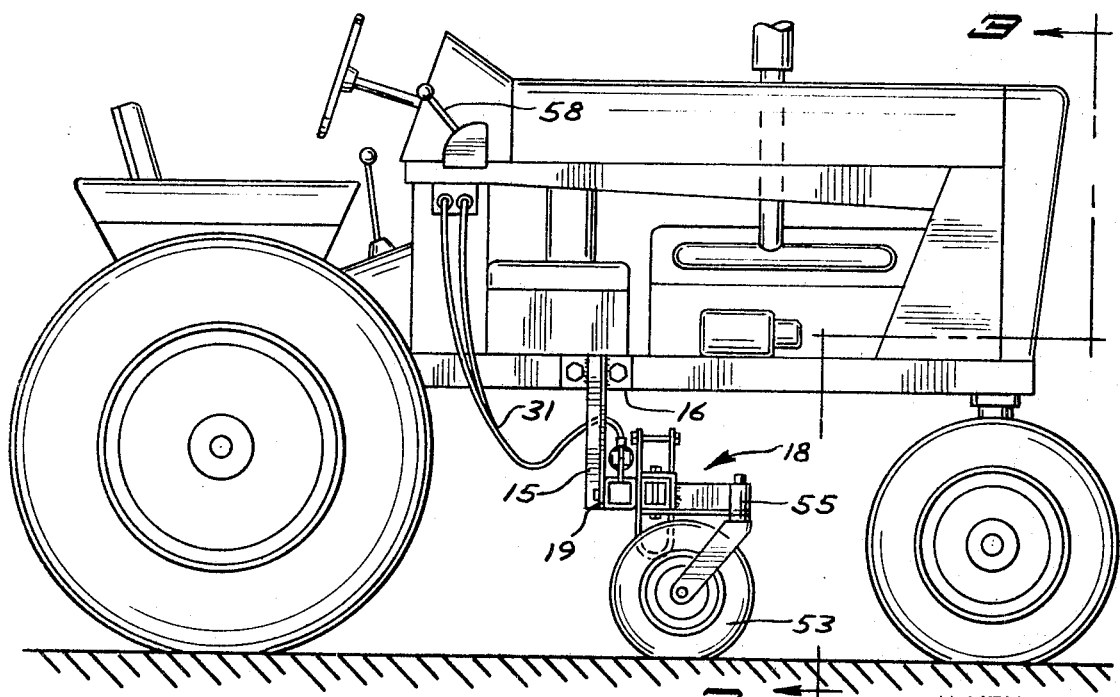
FIG. 2 is a side elevational view of a tractor carrying the spray boom apparatus of the present invention.

In accordance with the preferred modification of the present invention, and with particular reference to FIGS. 1–3 of the drawings, the spraying apparatus shown generally at 10 includes a tractor vehicle 11, along with a spray tank or spray supply source 12 trailing therebehind. The spray source 12 is coupled to the draw bar of the tractor vehicle as at 13. The tractor 11 carries a spray boom support bracket 15 which is mounted to the tractor frame as at 16, and a spray boom assembly generally designated 18 is mounted on the bracket 15 by suitable means, such as the bolts as at 19.

With particular attention now being directed to FIG. 3 of the drawings, the spray boom assembly 18 comprises a pair of laterally extending arms, such as the right arm 20 and the left arm 21. These individual arms 20 and 21 are provided with a plurality of spray nozzles 22—22, as is conventional in spray boom assemblies of this type. Intermediately of the individual laterally extending arms 20 and 21, there is disposed a carrier member 24 which may be in the form of a shaft, a tube, a box or the like. As illustrated in FIG. 4, and as more specifically discussed hereinafter, the individual arms 20 and 21 are arranged to move reciprocably inwardly and outwardly along the carrier member by virtue of their being secured to the slidable coupling sleeves 25 and 26. As is indicated in FIG. 3 of the drawings, the individual arms of the boom may also pivotally rock about the carrier member 24 by means of a pivotal connection to the members 25 and 26, particularly as is shown at 28. This permits the apparatus to traverse uneven or hilly terrain without diminishing the effectiveness of the spray assembly from one location to another. Still another function of this pivotal coupling is to permit the individual boom arms to be retracted to the disposition shown in phantom in FIG. 3, particularly for transport purposes.

The individual spray nozzles 22—22 are ararnged for adjustable disposition along the extent of the individual arms 20 and 21, by means of the mounting brackets shown at 30. Such brackets are considered conventional in the art. Also, as is indicated, a source of spray composition, which is retained within the apparatus 12 is distributed to the individual nozzles 22—22 by means of the supply conduits 31—31, wihch conduits communicate with a distribution head as at 32 for ultimate distribution to the individual nozzles through connecting supply conduits 33, 34, 35 and 36.

Particular attention is now directed to FIGS. 4 and 5 of the drawings wherein the details of construction of the spray boom assembly 18 are shown. In this connection, the apparatus is provided with a double acting hydraulic cylinder 40 which is served by a suitable source of operating fluid under pressure by the conduits 41 and 42. The hydraulic cylinder 40 is coupled to the carrier member 24 by the bracket 43, and has an extensible rod 44 extending from the opposite end thereof, the rod 44 being coupled, in turn, to a bracket or ear on the slidable coupling sleeve 25. A suitable coupling bracket such as is shown at 45 is utilized for this purpose.

The carrier member 24 which is coupled or anchored directly to the brackets 15—15, is further provided with a pivotal link member 47. This link member 47 is disposed substantially along the transverse axis of the spray boom, such as is shown in FIG. 5. Of course, it will be appreciated that if the coupling pin 48 which secures the link 47 to the carrier member 24 is shifted from a common central transverse position, suitable adjustments in the linkage arm may be utilized to compensate for any such shifting. It will be appreciated, therefore, that the common transverse axis of the spray boom may lie reasonably within and coincident with the geometric center of the boom. The arm 47 is provided with a pair of pivotal link members 50 and 51 for a purpose as will be made manifest hereinafter. Thus, motion imparted to the arm 47 by virtue of lateral motion of the slidable coupling sleeve 25 will be imparted to the slidable coupling sleeve 26 by virtue of the linkage including arms 50 and 51, and link 47. Thus, motion of the rod 44 of the hydraulic cylinder 40 which either extends or retracts arm 20 will be imparted to arm 21 by virtue of the linkage mechanism coupling one arm to the other.

It will be appreciated that the assembly may employ a pair of hydraulic cylinders for the coordinated motion of the individual arms 20 and 21, however, it will be appreciated that for purposes of ease of assembly and maintenance, a single double-acting cylinder is preferred.

It will be appreciated that the free ends of the arms may be supported by any convenient means, however, it has been found that caster-type support wheels such as are shown at 53 and 54 are preferred. These wheels are coupled to the arms 20 and 21 by means of suitable yokes 55, for example. The yokes provide for pivotal rotation of the caster wheels in order to accommodate the reciprocating action of the spray apparatus while in motion.

For a description of the operation of the apparatus, reference is made to FIGS. 1 and 2 wherein it will be seen that as the operator approaches the guess-row area of the field, it becomes necessary for him to direct the motion of the unit along a line so as to bisect the spacing between rows 56 and 57, and while so progressing, will retract the individual arms 20 and 21 inwardly so as to achieve the disposition shown in phantom in FIG. 1. This control is available, of course, by means of the control lever shown at 58, this lever controlling the output of fluid under pressure to the lines 41 and 42. Thus, upon reaching the end of the guess-row area, the operator will turn the machine around, and enter into an adjacent guess-row area for another pass through the field.

In order to retract and elevate the arms 20 and 21 into the disposition shown in phantom in FIG. 3, a pair of coupling links 60 and 61 are provided, these links being secured to the individual arms 20 and 21, and also to the carrier member 24, such as at and along the brackets 62 and 63 when the arms have been raised to the position shown. If desired, for purposes of controlling the extent of pivotal rotation of the individual arms 20 and 21, the bracket 62 may be provided with a cradle as at 64 in order to support the arm 20 thereon, and thus limit its extent of downward pivotal motion about the pin 28.

The spray apparatus of the present invention is adapted for use in connection with either wettable powders, or dry powders which may be sprayed without being in a solution or slurry form. The basic concept of the invention is to permit the operator to visually inspect the disposition of the crop rows, and while continuing his motion, provide a spray head disposed in superimposed relationship to the plant during the spraying operation. This disposition is made possible by virtue of the improved coordinated actuating and linkage means provided on the apparatus. The motion may be provided by a single hydraulic cylinder having a pair of operating pistons and arms in lieu of the mechanical linkage.

It will be appreciated, of course, that the details of construction shown herein are for purposes of illustration only, and are not to be otherwise construed as a limitation upon the scope to which this invention is otherwise reasonably entitled.

What is claimed is:

1. Spray apparatus means comprising:
   (a) means for coupling to a source of spray composition under pressure;
   (b) a spray boom having right and left laterally extending arms, each arm having a plurality of spray heads arranged to be lockingly disposed in predetermined laterally spaced spray discharge relationship therealong, each arm being coupled at its inner end to a carrier member, said carrier member defining a common transverse axis for said spray boom; and
   (c) means for controlably and simultaneously reciprocably moving said arms along said common transverse axis and relative to the carrier member in mutually coordinated fashion, said motion along said transverse axis being independent of the predetermined lateral spacing of said spray heads.

2. The spray apparatus means as defined in claim 1 being particularly characterized in that linkage arm means are provided for coordinating the reciprocable motion of said laterally extending arms to motion of an equal extent and of an opposite direction.

3. The spray apparatus means as defined in claim 2 being particularly characterized in that said linkage arm means are actuated by a source of hydraulic fluid under pressure.

4. The spray apparatus means as defined in claim 2 being particularly characterized in that said linkage arm means are actuated by a single double-acting hydraulic cylinder.

5. The spray apparatus means as defined in claim 2 being particularly characterized in that said linkage arm means includes a pivotal lever coupled to said carrier member along said common transverse axis, said pivotal lever being provided with coupling links extending to each of said arms.

6. The spray apparatus means as defined in claim 1 being particularly characterized in that caster support wheels are provided adjacent the free ends of each of said arms.

7. The spray apparatus means as defined in claim 1 being particularly characterized in that pivot links are provided to permit each of said laterally extending arms to be arranged in a retractable upwardly extending transport disposition.

8. The spray apparatus means as defined in claim 1 being particularly characterized in that said laterally extending arms are formed of an elongated enclosed member having a central axis.

9. The spray apparatus means as defined in claim 1 being particularly characterized in that said spray heads are adapted to be adjustably coupled to each of said arms in spaced disposition along the axis thereof.

References Cited

UNITED STATES PATENTS

| | | | |
|---|---|---|---|
| 598,945 | 2/1898 | Martin | 239—165 |
| 2,518,952 | 8/1950 | Sohmer | 239—165 X |
| 3,153,510 | 10/1964 | Brannfors et al. | 239—165 X |

M. HENSON WOOD, JR., Primary Examiner

M. Y. MAR, Assistant Examiner

U.S. Cl. X.R.

239—168